(12) United States Patent
He et al.

(10) Patent No.: US 8,285,899 B2
(45) Date of Patent: Oct. 9, 2012

(54) SD CARD INCLUDING SMART CARD AND METHOD FOR ACCESSING TO THE SAME BASED ON A FILE SYSTEM

(75) Inventors: Shuo He, Shanghai (CN); Hongwen Meng, Shanghai (CN); Jia Hu, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 307 days.

(21) Appl. No.: 12/717,920

(22) Filed: Mar. 4, 2010

(65) Prior Publication Data
US 2010/0205373 A1   Aug. 12, 2010

Related U.S. Application Data

(63) Continuation of application No. PCT/CN2008/071591, filed on Sep. 7, 2008.

(30) Foreign Application Priority Data

Sep. 6, 2007 (CN) .......................... 2007 1 0045741

(51) Int. Cl.
*H04B 1/38* (2006.01)
*G06F 13/12* (2006.01)
*G06F 13/00* (2006.01)

(52) U.S. Cl. ............................. 710/74; 455/558; 711/100

(58) Field of Classification Search .................... 455/73, 455/557, 558; 707/821–831, 899; 710/1, 710/62, 72, 74; 711/100, 115; 719/328
See application file for complete search history.

(56) References Cited

U.S. PATENT DOCUMENTS

| | | | |
|---|---|---|---|
| 2004/0164170 A1 | 8/2004 | Krygier et al. | |
| 2004/0210715 A1 | 10/2004 | Harari et al. | |
| 2005/0138303 A1* | 6/2005 | Nagino et al. | 711/154 |
| 2006/0043202 A1 | 3/2006 | Kim et al. | 235/492 |
| 2009/0075592 A1* | 3/2009 | Nystrom et al. | 455/41.1 |
| 2009/0200369 A1 | 8/2009 | Handa et al. | 235/375 |

FOREIGN PATENT DOCUMENTS

| | | |
|---|---|---|
| CN | 1641680 A | 7/2005 |
| CN | 1761346 A | 4/2006 |
| EP | 1 722 305 A1 | 11/2006 |
| WO | WO 2007/076456 A2 | 7/2007 |

* cited by examiner

*Primary Examiner* — Chun-Kuan Lee
*Assistant Examiner* — Richard B Franklin
(74) *Attorney, Agent, or Firm* — Martine Penilla and Group, LLP.

(57) ABSTRACT

A smart SD card and a method of accessing the same are disclosed, which resolve a problem of incompatibilities between drivers of various smart SD cards. The smart SD card includes a SD interface (201), a SD memory (203), a smart card (204) and a SD controller (202). The method of accessing the SD card includes: an application program performing a write operation on the smart card interface file and notifying the SD controller establishing a communication connection with the smart card; the application program reading the interface file and receiving response data returned by the smart card via the SD controller; the establishing of the connection being successful, the application program writing the smart card operation commands into the interface file, and the SD controller forwarding the commands to the smart card; the application program reading the interface file and receiving response data returned by the smart card via the SD controller.

8 Claims, 2 Drawing Sheets

SD CARD INCLUDING SMART CARD AND METHOD FOR ACCESSING TO THE SAME BASED ON A FILE SYSTEM

This application claims priority under 35 U.S.C. §§120 and 365(c) as a continuation application of prior International Application PCT/CN2008/071591, which was filed on Sep. 7, 2008, which claimed priority to Chinese Patent Application CN200710045741.1, filed on Sep. 6, 2007. The disclosure of the prior international application is incorporated herein by reference.

FIELD OF THE INVENTION

The present invention relates to the data access technology, and more particularly, relates to a smart SD card and a method for accessing to it.

BACKGROUND

As a new generation memory device based on the semiconductor flash memory, the SD (Secure Digital Memory) card with small volume, which has a high memory capacity, a high data transfer rate and is very easy to move, is widely used in the mobile phone, MP3, digital camera and digital video and so on for more storage space. When a smart chip is integrated into a common SD card (including any SD card with different size such as Mini SD card etc.), the common SD card is called smart SD card, and accordingly the smart SD card provides a smart card service besides the traditional storage function.

Recently, the smart card integrated into the SD card is accessed in the manner of driver. Thus the manner of accessing to the smart SD card differs from accessing to the common SD card. The common SD card is accessed by the peripheral devices in the manner of file system, that is, the common SD card is compatible with various kinds of access from the peripheral devices. The storage space of the smart SD card is also accessed in the manner of file system, however, accessing to the smart card integrated into the SD card needs an installed corresponding driver, and the write and read operation to the smart SD card are achieved through the interface provided by the driver.

However, the driver is programmed according to the type of the used device; that is to say, different driver should be programmed for different type of device, wherein the interface provided by each type of the driver for the peripheral device is different from each other. Therefore, the application field of the smart SD card is limited for the accessing manner, which is based on the driver, and thus only enables a few types of device to use the smart card integrated in the smart SD card, because it is impossible in practice to program the driver for each type of the device.

Further, the smart SD card can provide a variety of application services, such as debit and credit application, bulk electronic payment application for debit and credit, electronic purses application and other financial application for payment and other applications in the field. If the smart card integrated into the smart SD card is accessed through the interface (API) provided by the driver, the classification list of the devices which are supported by the smart SD card should be defined, so that, it may be possible that main devices in the market can be supported, however, it will make the release and maintain of the applications be hard. For example, for the payment application or the payment combined with other industries application, such as the financial payment combined with the public transportation application, such applications require covering the area of the application as more as possible. Moreover, all of the application modules for communicating with the smart card integrated into the smart SD card, such as card distribution, downloading over the air and recharging over the air etc., should be programmed individually when using the manner of application interface.

SUMMARY OF INVENTION

The object of this invention is to provide a smart SD card and a method of accessing to the smart SD card, to resolve the problem about incompatibility of different smart SD card's drivers.

According to one embodiment of the present invention, a solution which can resolve the aforementioned problems is disclosed as follows:

A smart SD card, including:

SD interface, for providing an access interface for peripheral devices in the manner of file system, wherein a smart card interface file is set in the file system;

SD memory, for providing the storage space;

smart card, for providing application service; and

SD controller, for identifying an operation to the file system from the peripheral devices, accessing to the smart card if the operation directing to the smart card interface file, otherwise, accessing to the SD memory.

In above solutions, the SD controller interprets the writing operation to the smart card interface file from the peripheral device as sending command to the smart card, and interprets the reading operation as receiving response data returned by the smart card.

In above solutions, the smart card interface file is stored in a root directory of the file system with 0 byte length, and the feature of the interface file is set as hide.

In above solutions, the smart card provides the interface for communicating with the SD controller.

The smart SD card further includes a near field non-contact chip connected with the smart card, for providing near field non-contact access to the smart card.

A method for accessing to the smart SD card, including:

an application procedure executing the writing operation to a smart card interface file, to inform a SD controller of establishing communication with a smart card;

the application procedure reading the interface file and receiving response data returned by the smart card through the SD controller;

the application procedure writing the smart card operation command into the interface file and the SD controller forwarding the commands to the smart card, when the connection is established successfully; and the application reading the interface file and receiving the response data returned by the smart card through the SD controller.

The method further includes: the SD controller records the communication status with the smart card and returns it to the application procedure, and the application procedure continues to read and write the smart card interface file if the status is normal.

The method further includes: the application procedure writes a tag of each operation into the interface file, and reads the tag when reading file; and determines whether the written tag matches the read tag, if mismatching, then a fault tolerant process is executed.

In above solutions, the application procedure receives the response data returned by the smart card as follows: the smart card returning the command response information to the SD controller, and the SD controller identifying the command response information; if the SD controller identifying that there is data returned, the SD controller sending automatically obtaining command to obtain the response data; and the application procedure reading and obtaining, when the SD controller receiving all of the response data.

Or the application procedure receives the response data returned by the smart card according to the following steps: the smart card returning the command response information to the SD controller, and the SD controller directly buffering the command response information for the application procedure reading; the application procedure identifying the command response information, and obtaining command is sent by the SD controller if identifying there is data returned; and according to the obtaining command, the smart card returning response data to the SD controller for the application procedure reading.

According to the embodiments provided by the present invention, the following technical effects are disclosed:

Firstly, with the interface which is provided by the common SD card for each type of devices being file system, the interface through which the smart card is accessed is mapped to one file (the smart card interface file) of the file system, thus the peripheral application procedure accesses to the smart card by accessing the smart card interface file. The smart SD card controls each operation of the application procedure via the SD controller, in which the writing operation to the interface file is regarded as sending command to the smart card, and the reading operation is regarded as receiving the response data returned by the smart card. Accordingly, the SD controller controls both the storage function of the SD card and the smart card service.

By defining a universal interface file according to above described method, both reading the file and writing the file are mapped indirectly to the smart card integrated into the SD card, and the operation to the smart card is implemented, thereby accessing to the smart card without driver is achieved and any top level application procedure which can access to the SD card can easily access to the smart card integrated into the SD card though the interface.

Secondly, during the application procedure accessing to the smart card, an efficient data receiving method is provided as follows: after the SD controller receives the command response information returned by the smart card, it sends obtaining command to the smart card when identifying that there is data still returned. The application reads the response data till the SD controller receives all of the response data. In comparison with the manner in which any response data received from the smart card each time are not processed, but provided for the application procedure reading, the manner in which the SD controller returns all of the response data to the application procedure saves the number of the interact between the SD controller and the application and the time thereof, thereby improves the efficiency of the data response.

In addition, a fault tolerant mechanism is also provided during the operating to the smart SD card. The application procedure writes a tag of the current operation when writing the interface file and the tag should be returned by the SD controller when reading the file. If the returned tag mismatches the written one, the error may occur in the operating process; in this case, the application procedure executes the fault tolerant process to re-executes the writing and reading file operation.

DETAILED DESCRIPTION

The objection, features and advantages of the present invention will be better understood by reading the following detailed description in combination with the embodiments and attached drawings.

The interface, which is offered by the common SD card when the access function is provided to each of the devices, is a file system. The interface further is a universal interface, thus the common SD card can be accessed without driver. The smart card of the SD card of the present invention is accessed by using the interface file of the SD card, thereby accessing to the smart SD card without driver is achieved.

Figure 1:
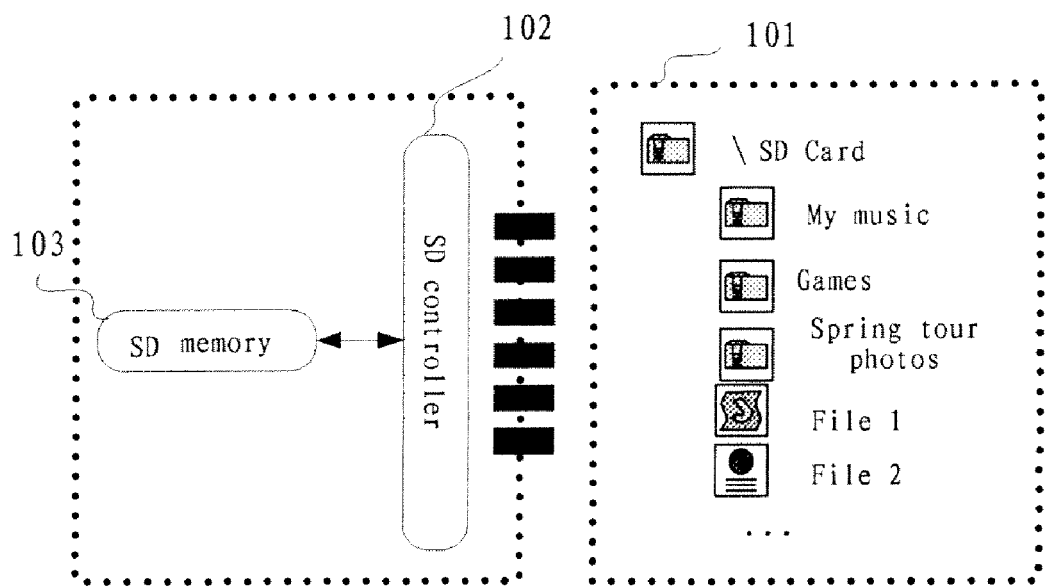
FIG. 1 is a schematic diagram of the interface according to an existing common SD card.

FIG. 1 schematically shows the interface of an existing common SD card. A common SD card mainly includes an interface 101, a controller 102 and a storage unit 103. The storage unit 103 is used to provide the storage space for the SD card, the controller 102 is responsible for controlling the access to the storage unit 103 from the peripheral devices, and the interface 101 connects the peripheral devices and the SD card, wherein the interface 101 is implemented by the file system. In the example shown in FIG. 1, "My Music", "Game", "Spring tour photos", "File 1" and "file 2" and other folders or files are listed in the root directory of the file system. The SD controller 102 is aware of the peripheral commands when the peripheral devices access to the SD card by accessing the files or folders, then the SD controller 102 interprets the accessing commands as the corresponding operations to the storage unit 103.

Figure 2:
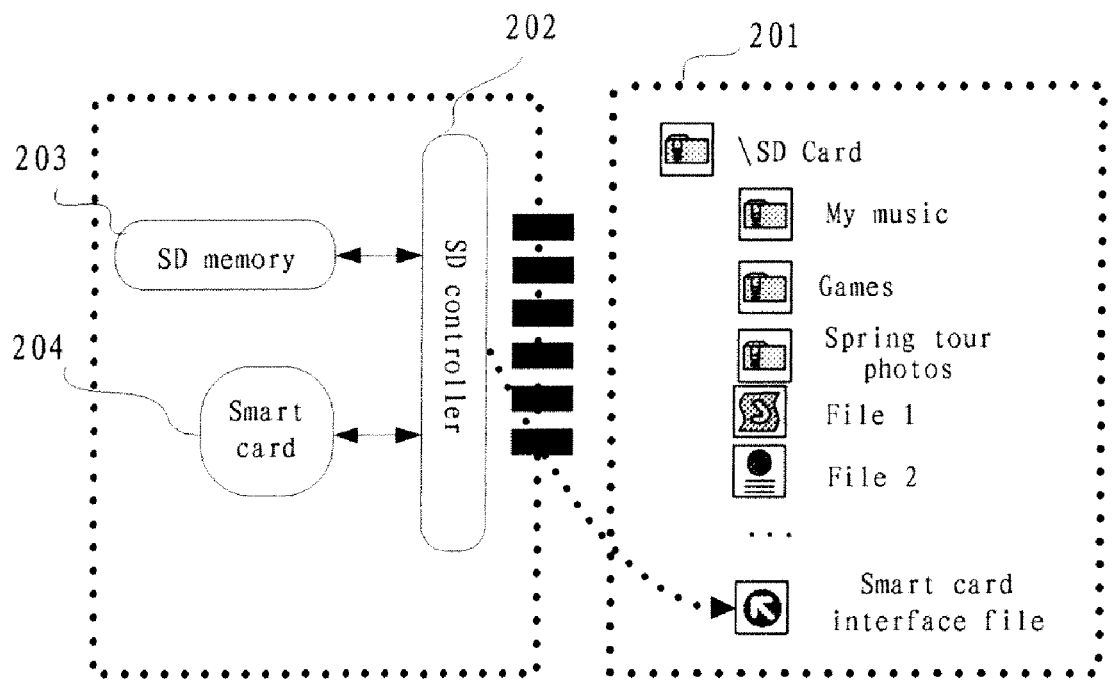
FIG. 2 is a schematic diagram of the interface according to an embodiment of the present invention.

FIG. 2 schematically shows the interface of the smart SD card according to the present invention. The smart SD card, which is made by integrating a smart card chip into a common SD card, provides the storage function and the smart card services. As shown in FIG. 2, the smart SD card includes a SD interface 201, a SD controller 202, a SD memory 203 and a smart card 204, wherein the SD memory 203 is used to provide the storage function, the smart card 204 provides a various of application services, and the SD controller 202 controls the access to SD memory 203 or smart card 204 from the peripheral devices. On the basis of its original function, the SD interface 201 further offers a universal interface for accessing the smart SD card 204. a various of peripheral devices thus can access to the smart card 204 in the SD card.

As described above, the interface which the common SD card provides for a various of device is a file system, thus the operation, operated by the peripheral devices to the file, is regarded as operation to the storage unit. With this theory, the interface 201 of the smart SD card also provides a file system; however, a smart card interface file is set in the file system. The operation to the smart card 204, is implemented by the SD controller 202 indirectly mapping the read and write the smart card interface file to the smart card 204 of the SD card, thereby it is achieved to access to the smart SD card without driving. And any peripheral device, which can access to the SD card, can easily access to the smart card 204 integrated into the SD card. If there are plurality of smart card interface files in the root directory of the file system, it means plurality of the smart cards each of which provides certain service are integrated into the SD card.

The smart card interface file has characteristics and features as follows:

Firstly, similar to the "My Music", "Games", "Spring tour photos", "File 1", "File 2" and other files or folders, the smart card interface file is set in the same root directory of the file system for easily managing and operating, as shown in FIG. 2.

Secondly, the smart card interface file is a virtual file, and the common files, such as "File 1" and so on, possess the real physical location. As the smart card interface file is a virtual file controlled by the SD controller 202, when the peripheral devices read or write the smart card interface file, the SD card 202 interprets the contents read or wrote as the operation commands to the smart card 204, rather than writes the contents into the SD memory 203.

Thirdly, the smart card interface file do not possess the storage space of the storage unit 203, however, the length of the file is fixed as 0 byte and the features of the file is set as hide, to avoid the user's worry that the storage space is possessed by the file.

For the smart card 204, it responds with data after receiving commands sent by the peripheral devices. And for the smart card interface file, reading the file to obtain the data should be executed after writing the file. Correspondingly, the SD controller 202 interprets the writing operation to the file as sending commands to the smart card 204, and interprets the reading operation to the file as the response data to the received commands. The SD controller 202 interprets the reading operation to the other files in the root directory as operating command to the SD memory 203.

All of the operating commands which are sent to the smart SD card by the peripheral devices will be interpreted by the SD controller 202 according to a certain format. As an example, a data format of writing the smart card interface file is given as Table 1.

TABLE 1

Writing Data Format

| Offsetting | Length of byte | Description | existing |
|---|---|---|---|
| 0 | 2 | Command code | must |
| 2 | 2 | Identification code | must |
| 2 | 2 | The length of APDU command | Existing if needed |
| 4 | variable | APDU | Existing if needed |
| | 1 | Byte check and (LRC) | Existing if needed |
| ... | ... | ... | ... |

The definitions for command codes shown in Table 1 are shown in Table 2 as follows:

TABLE 2

Definition for the Command Codes

| Code | Value | Description |
|---|---|---|
| SCIF_ATR | 10h | informing the SD controller of obtaining the ATR information of the smart card |
| SCIF_SET_M1 | 11h | setting the receiving mode as mode 1 |
| SCIF_SET_M2 | 12h | setting the receiving mode as mode 2 |
| SCIF_SET_IF | 13h | setting the parameters of the smart card interface file |

TABLE 2-continued

Definition for the Command Codes

| Code | Value | Description |
|---|---|---|
| SCIF_GET_VER | 14h | Obtaining the information on the version, the type and other matters of the SD controller |
| SCIF_APDU | 20h | informing the SD controller of forwarding the APDU command |
| ... | ... | ... |

The data, which is prepared to write into the smart card 204 by the peripheral device, is organized according to the format shown in Table 1, wherein the "command code" defines the types of the operations to the smart card 204 as shown in table 2. The SD controller interprets the "command code", thereby obtains how to operate the smart card 204. "APDU" is an interface which is provided by the smart card 204 for the peripheral access and through which the SD controller 202 interact with the smart card 204. The command format defined by the interface is APDU command, and the command which is sent by the peripheral devices to the smart SD card essentially is APDU command, thus the SD controller 202 can forward the APDU command directly to the smart card 204 for executing. More details relating to the APDU command belong to the description scope of the smart card and its specification, thus will not described here.

Preferably, "identification code" should be set for identifying each of the accessing operations. By identifying the identification code to identify whether the operating command corresponds to the returned responsive data, the application can avoids the mismatch between the operation commands and the response to the command.

The data formats for reading the smart card interface file are shown in table 3 as follows:

TABLE 3

Reading Data Format

| Offsetting | Length of byte | Description |
|---|---|---|
| 0 | 2 | Identification code |
| 2 | 1 | Communication status code |
| 3 | 2 | Execution status code for APDU command |
| 5 | 2 | Response data length |
| 7 | | Response data |
| ... | ... | ... |

There is no any data in the smart card interface file at the beginning. Only after the writing command has been sent, the peripheral device can read the file and obtain the processing result or responsive data of the last command. The contents read from the file can be explained according to the format shown in Table 3, wherein "Execution status code for APDU command" is also called command responding code, for identifying the executing status of the command, such as finished or waiting for receiving the data and so forth.

Preferably, the "communication status code" defines the intercommunication between the SD controller 202 and the smart card 204. The peripheral devices firstly identify whether the communication status code is right, then identify the later data, wherein the communication status code is defined as follows:

TABLE 4

Definitions for Communication Status

| code | Value | Description |
|---|---|---|
| SCIF_IO_OK | 00h | Communication is normal |
| SCIF_IO_TIMEOUT | XX | Communication is time out |
| ... | ... | ... |

The tables above described, from Table 1 to Table 4, is only explained as an example, and not used to limit the format of the interface file.

Figure 3:
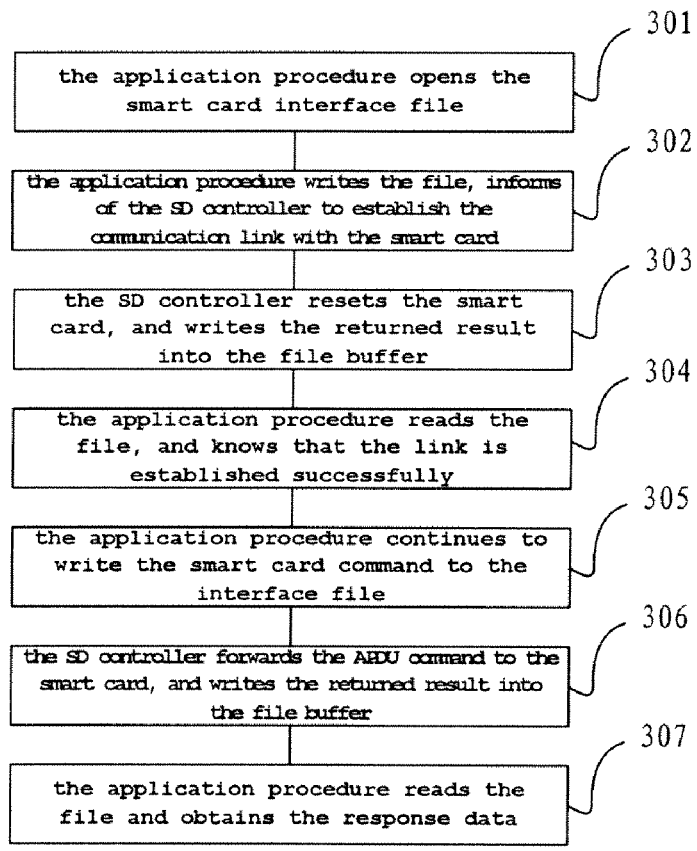
FIG. 3 shows a flow chart according to the method for accessing to the smart SD card of the embodiment of the present invention.

A universal interface, through which each type of peripheral devices can access to the smart card of the SD card, has been described hereinbefore. The present invention further provides a method example for accessing the smart SD card based on the smart SD card above described. FIG. 3 shows the flow chart of the method for accessing to the smart SD card. Since "the peripheral device accesses to the smart SD card" is equal to" the application procedure installed in the device accesses to the smart SD card" substantially, the access to the smart card of the SD card by the application will be described hereinafter in detail as the example.

In step of 301, the peripheral application procedure (in short of application) opens the smart card interface file of the smart card; and the accessing procedure will end if it fails to open.

In step of 302, the application procedure executes the writing file operation, and informs the SD controller of establishing the communication link with the smart card.

In step of 303, the SD controller knows that the operation directs to the smart card when it receives the writing file command from the operating system and identifies that the operating system tries to write the smart card interface file. The SD controller further identifies the written contents according to the Writing Data Format shown in tables 1 and 2, and if the SD controller interprets that the command of step 302 is obtaining the ATR (Answer to Reset) information, then the smart card is power-on reset and established the communication link for obtaining the ATR information of the smart card. The power-on resetting means the smart card automatically sends it's corresponding information (such as the parameter of communication etc.) to the SD controller, such that the SD controller can identify the type of the smart card correctly and execute the corresponding operation to the smart card.

Preferably, the SD controller records the current inner communication status this time; and if the status is normal, then forwarding to next step, otherwise setting the response error code in the contents of the file and ending the process.

The SD controller writes the communication status code with the smart card, command response code returned by the smart card and ATR information into the buffer of the contents of the interface file, for the application procedure reading.

In step of 304, the application procedure reads the contents of the file and interprets the contents according to the format shown in Table 3, to know the response from the SD controller (i.e., whether the communication link is established). If the communication link has been established, then forwarding to next step, otherwise ending.

In step of 305, the application procedure further writes the command of the smart card (i.e., APDU command) into the interface file according to the logic of the business.

In step of 306, the SD controller forwards the APDU commands and records the current communication status this time when it determines what the command means is forwarding the APDU commands to the smart card. Then the smart card executes the command and returns the command response to the SD controller, and the SD controller writes the communication status code with the smart card, the command response returned by the smart card and the response data into the buffer of the contents of the interface file, for the application procedure reading.

In step of 307, the application procedure reads the file, and thus obtains the response data, and identifies the communication status code. If the status code is normal, then forwarding to next step, otherwise ending.

The steps above described are executed repeatedly between the application procedures and the smart SD card till all of the operations to the smart card by the application procedure end.

In the steps described hereinbefore, two manners are taken for the application procedure receiving the response data of the smart card through the SD controller, that is, the SD controller takes two manners as follows when it receives the response data and the command response code of the smart card after forwarding the ADPU command to the smart card:

One way is that the SD controller, when it receives any response data and command response code of the smart card, directly writes them into the file cache for the application procedure reading without any operating. For example: the smart card returns 61XX code representing that the command is executed normally and requesting for the taking data command to read data, if the smart card still have data to be returned; after receiving such command response code, the application procedure continues sending the taking data command and obtains the returned data of the last command through the SD controller, then the smart card returns the real data at this time.

The way above described is transparent, because the operations between the application procedure and the smart card are not interfered by the SD controller, however, the defect existing in this way is that the application procedure have to send taking data command many times to obtain all of the data if the smart card multi-returns the response data. To save the time and the number of interactions between the application procedure and the SD controller, the SD controller identify the received command response code, and if the smart card still have data to be returned, the SD controller automatically sends the taking data command to the smart card for obtaining the response data of last command, and then writes the data into the file buffer. The SD controller repeatedly executes the steps above described till all of the response data is returned by the smart card. Thus, the time is saved and the efficiency is improved.

Preferably, during the operating to the smart SD card, a fault tolerant mechanism is also provided. The operation command may not correspond to the command response data during the application procedure accessing the smart SD card, for example, the application procedure sends two commands which are separately command A and B to the smart SD card, however, the smart SD card may firstly return the response data to the command B and then to command A for some reason, in that case, the application procedure makes the operation command and the command response be mismatched, if no identifying procedure is executed by the application procedure. Accordingly, a fault tolerant mechanism is provided herein, in which the application procedure writes a tag of the current operation when writing the interface file, and the tag should be returned by the SD controller when reading the file. If the returned tag mismatches the written tag, the error may occur in the operating process; in this case, the application procedure executes the fault tolerant process to re-executes the writing and reading file operation.

To limit the length of the description of the present invention, the parts of the method shown in FIG. 3, which are not described in detail and may see the corresponding parts shown in FIG. 2, will not be detailed herein.

Figure 4:
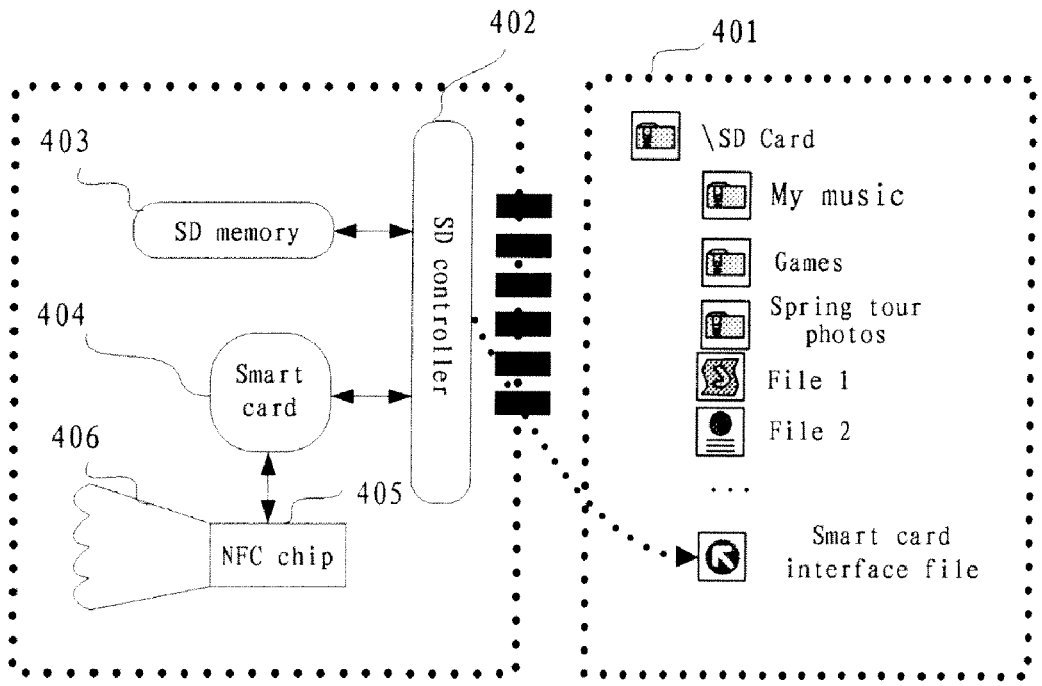
FIG. 4 is a schematic diagram of another interface according to an embodiment of the present invention.

Preferably, another smart SD card added a NFC (New Field Communication) chip is provided according to the present invention, as shown in FIG. 4. The smart SD card includes a SD interface 401, a SD controller 402, a SD memory 403, a smart card 404 and NFC chip 405. In comparison with the smart SD card shown in FIG. 2, one NFC chip 405 is connected to the smart card 404 in the smart SD card, wherein the NFC chip 405 is a smart card chip supporting the NFC technology. The NFC chip 405 is connected to the antenna 406 for enabling non-contact access to the smart SD card. The NFC technology, which combines the sensitive card reader, sensitive card and point to point function into a single device to enable the exchange of data between the device and the compatible devices over short distance, is derived from the combination of the non-contact radio frequency identification (RFID) and mutual-communication technology. Since the NFC chip provides the non-contact access, when the smart SD card with an integrated NFC chip interacts with the peripheral devices (or the application procedure), it enable the identification and exchange of the data with the compatible devices by the antenna 406, rather than in the manner established as above described.

To limit the length of the description of the present invention, the parts of the method shown in FIG. 4, which are not described in detail and may see the corresponding parts shown in FIG. 2, will not be detailed herein.

The smart SD card and the method for accessing to the smart card has been described in detail in combination with exemplary embodiments, however, it can be understood that these exemplary embodiments are only used to explain the theory and the main thoughts of the present invention; and for those skilled in the art, any various change in the embodiments and the application field based on the spirit of the present invention should not limit the scope of the invention.

The invention claimed is:

1. A smart SD card, including:
   SD interface, for providing an access interface for peripheral devices in the manner of file system, wherein a smart card interface file is set in the file system;
   SD storage unit, for providing a storage space;
   smart card, for providing application service; and
   SD controller, for identifying an operation to the file system from the peripheral devices, and accessing to the smart card if the operation directing to the smart card interface file, otherwise, accessing to the SD storage unit;
   wherein the SD controller interprets a writing operation to the smart card interface file from the peripheral device as sending command to the smart card, and interprets a reading operation as receiving response data returned by the smart card, and wherein the smart card returns a command response information to the SD controller, and then the SD controller identifies the command response information, if the SD controller identifies that there is data returned, the SD controller automatically sends an obtaining command to obtain the response data such that the peripheral device reads and obtains the response data after the SD controller have received all of the response data.

2. The smart SD card of claim 1, wherein the smart card provides the interface for communicating with the SD controller.

3. The smart SD card of claim 1, further includes a near field non-contact chip connected with the smart card, for providing near field non-contact access to the smart card.

4. A smart SD card, including:
   SD interface, for providing an access interface for peripheral devices in the manner of file system, wherein a smart card interface file is set in the file system;
   SD storage unit, for providing a storage space;
   smart card, for providing application service; and
   SD controller, for identifying an operation to the file system from the peripheral devices, and accessing to the smart card if the operation directing to the smart card interface file, otherwise, accessing to the SD storage unit, wherein the smart card interface file is stored in a root directory of the file system with 0 byte length, and a feature of the interface file is set as hide.

5. A method for accessing to a smart SD card, including:
   an application procedure executing the writing operation to a smart card interface file, to inform a SD controller of establishing communication with a smart card;
   the application procedure reading the interface file and receiving response data returned by the smart card through the SD controller;
   the application procedure writing a smart card operation command into the interface file and the SD controller forwarding the commands to the smart card, when the communication is established successfully; and
   the application reading the interface file and receiving the response data returned by the smart card through the SD controller;
   wherein the application procedure receives the response data returned by the smart card as follows;
   the smart card returning the command response information to the SD controller, and the SD controller identifying the command response information, if the SD controller identifying that there is data returned, the SD controller automatically sending an obtaining command to obtain the response data; and the application procedure reading and obtaining the response data after the SD controller having received all of the response data.

6. The method of claim 5, further includes: the SD controller records a communication status with the smart card and returns it to the application procedure, and the application procedure continues to read and write the smart card interface file if the communication status is normal.

7. The method of claim 5, further includes: the application procedure writes a tag of each operation into the interface file, and reads the tag when reading file; and determines whether the written tag matches the read tag, if mismatching, a fault tolerant process is executed.

8. The method of claim 5, wherein the application procedure receives the response data returned by the smart card according to the following steps:
   the smart card returning the command response information to the SD controller, and the SD controller directly buffering the command response information for the application procedure reading;
   the application procedure identifying the command response information, and obtaining command is sent by the SD controller if identifying there is data returned; and
   according to the obtaining command, the smart card returning response data to the SD controller for the application procedure reading.

* * * * *